United States Patent
Cao

(10) Patent No.: US 10,444,572 B2
(45) Date of Patent: Oct. 15, 2019

(54) LIQUID CRYSTAL DISPLAY PANEL HAVING UPPER AND LOWER SPACERS WITH TAPPERED EDGES

(71) Applicant: Shenzhen China Star Optoelectronics Semiconductor Display Technology Co., Ltd., Shenzhen (CN)

(72) Inventor: Wu Cao, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 98 days.

(21) Appl. No.: 15/578,714

(22) PCT Filed: Nov. 15, 2017

(86) PCT No.: PCT/CN2017/111081
§ 371 (c)(1),
(2) Date: Dec. 1, 2017

(87) PCT Pub. No.: WO2019/047370
PCT Pub. Date: Mar. 14, 2019

(65) Prior Publication Data
US 2019/0072801 A1 Mar. 7, 2019

(30) Foreign Application Priority Data
Sep. 7, 2017 (CN) .......................... 2017 1 0802022

(51) Int. Cl.
*G02F 1/1339* (2006.01)
*G02F 1/1333* (2006.01)

(52) U.S. Cl.
CPC ........ *G02F 1/13394* (2013.01); *G02F 1/1333* (2013.01); *G02F 2001/13396* (2013.01); *G02F 2001/13398* (2013.01)

(58) Field of Classification Search
CPC combination set(s) only.
See application file for complete search history.

(56) References Cited

U.S. PATENT DOCUMENTS

| | | | |
|---|---|---|---|
| 2013/0235294 A1* | 9/2013 | Nomura | G02F 1/1339 349/43 |
| 2016/0004115 A1* | 1/2016 | Uchiyama | G02F 1/13394 349/42 |
| 2016/0085105 A1* | 3/2016 | Jeon | G02F 1/136286 349/110 |

FOREIGN PATENT DOCUMENTS

| | | |
|---|---|---|
| CN | 102360143 A | 2/2012 |
| CN | 102998852 A | 3/2013 |

(Continued)

*Primary Examiner* — Lauren Nguyen
(74) *Attorney, Agent, or Firm* — Leong C. Lei

(57) ABSTRACT

The present invention provides a liquid crystal display panel and a manufacturing method thereof. The manufacturing method of the liquid crystal display panel according to the present invention uses a regular mask plate to subject multiple layers of photoresist films that are stacked on each other to patterning treatment with just one round of exposure and development process to form multiple photoresist layers that are stacked on each other, wherein the multiple stacked photoresist layers form photo spacers. Due to the multiple layers of photoresist films having different photosensitivity properties, the multiple photoresist layers, which are formed after being subjected to exposure and development, are of different patterns, wherein being of different patterns means there is a difference existing in at least one of parameters including upper end size, lower end size, and tapering angle. The present invention makes use of the multiple photoresist (Continued)

layers of different patterns to achieve adjustment of the tapering angle θ of the photo spacer in order to effectively enlarge the tapering angle θ of the photo spacers. The liquid crystal display panel according to the present invention includes photo spacers that each include multiple photoresist layers stacked on each other, wherein the multiple photoresist layers are of different patterns so as to effectively enlarge the tapering angle θ of the photo spacers.

11 Claims, 5 Drawing Sheets

(56) References Cited

FOREIGN PATENT DOCUMENTS

| | | |
|---|---|---|
| CN | 105182625 A | 12/2015 |
| CN | 105445996 A | 3/2016 |
| CN | 105974651 A | 9/2016 |
| KR | 20090054339 A | 5/2009 |

* cited by examiner

LIQUID CRYSTAL DISPLAY PANEL HAVING UPPER AND LOWER SPACERS WITH TAPPERED EDGES

BACKGROUND OF THE INVENTION

1. Field of the Invention

The present invention relates to the field of display technology, and more particular to a liquid crystal display panel and a manufacturing method thereof.

2. The Related Arts

Liquid crystal display (LCD) has various advantages, such as thin device body, low power consumption, and a wide range of applications, and has been widely used, such as mobile phones, personal digital assistants (PDAs), digital cameras, computer screens, and notebook computer screens.

Most of the liquid crystal displays that are currently available in the market are backlighting LCDs, which comprise a backlight module, a liquid crystal panel coupled to the backlight module, and a front bezel fixing the liquid crystal panel and the backlight module. The working principle of the liquid crystal panel is that with liquid crystal molecules disposed between two parallel glass substrates and multiple vertical and horizontal tiny conductive wires arranged between the two glass substrates, electricity is applied to control direction change of the liquid crystal molecules for refracting out light emitting from the backlight module to generate an image.

Photo spacer (PS) is a structure that is commonly used in the liquid crystal display panel to provide an effect of supporting and is generally made of a photosensitive resin and, depending on whether it is different from a black matrix (BM) material used, different techniques and structural arrangements are available. For flat panel displays, necessity is not only that the photo spacer provides a stable and uniform supporting feature, but is also that the photo spacer demonstrates high degree of uniformity and provides a relatively large operation range of adjustment of tapering in order to fit to various design requirements for pixel, save space of arrangement, reduce area of order-less orientation of liquid crystal, and also to reduce barrier of liquid crystal material caused by the photo spacer.

However, the traditional way of operation for manufacturing photo spacers are often constrained by material characteristics and structural designs so that it is generally hard to control tapering of the photo spacer and the photo spacer so manufactured often has smaller tapering, leading to the result that the lower surface area of the photo spacer is greater than the upper surface area thereof that is in direct contact with a substrate. A relatively large value of PS bias between the upper end and the lower end increases cost of space for pixel designing.

A solution that is currently available for increasing the tapering of the photo spacer is using a multi-tone mask plate (having multiple values of light transmission rate) to form a small loop of groove in a circumference of the lower end of the photo spacer to increase, in an alternative way, the tapering of the photo spacer. However, such a solution involves the use of a multi-tone mask plate that is of a high cost and thus, production cost is increased.

Another solution that is known for adjusting and regulating the tapering of the photo spacer is to form a single layer of film with a photoresist material that includes two photo initiators that absorb different wavelengths. By adjusting the ratio of the constitutional components of the photoresist material and the number of times of exposure, the tapering of the photo spacer may be adjusted. However, such a solution is of a complicated design and process, requiring many times of exposure, and the constitutional components of the photoresist material must be adjusted in order to adjust the tapering, making the controllability low.

SUMMARY OF THE INVENTION

Objectives of the present invention are to provide a manufacturing method of a liquid crystal display panel, which effectively increases a tapering angle $\theta$ of a photo spacer so as to save the space for arrangement of the photo spacer, reduce a blocking effect caused by the photo spacer on a liquid crystal material, and improve supporting performance of the photo spacer.

Objectives of the present invention are also to provide a liquid crystal display panel, which comprises a photo space having a relatively large tapering angle $\theta$ so as to save the space for arrangement of the photo spacer, reduce a blocking effect caused by the photo spacer on a liquid crystal material, and provide a strengthened supporting performance.

To achieve the above objectives, the present invention provides a manufacturing method of a liquid crystal display panel, which comprises:

providing a first base plate and a second base plate, forming a first photoresist film on the first base plate, and forming a second photoresist film on the first photoresist film, wherein the first photoresist film and the second photoresist film demonstrate different properties of photosensitivity, wherein the first photoresist film and the second photoresist film have different absorption wavelengths for photo reaction, or alternatively, the first photoresist film and the second photoresist film demonstrate different sensitivities for photo reaction with light of the same wavelength;

using one mask plate to subject the first photoresist film and the second photoresist film to one round of exposure and development process to form a first photoresist layer and a second photoresist layer that are of different patterns so as to form a plurality of photo spacers, which are spaced from each other, on the first base plate, wherein being of different patterns is that a difference exists in at least one of parameters including upper end size, lower end size, and tapering angle and wherein the photo spacers each comprise the first photoresist layer that is arranged on the first base plate and the second photoresist layer that is arranged on the first photoresist layer and a tapering angle $\theta$ of the photo spacers is defined as an angle between a line connecting an edge of a lower end of the first photoresist layer and an edge of an upper end of the second photoresist layer and the first base plate, and wherein the photo spacers have a structure that is one of the following three structures:

a first structure being such that an upper end width w1 of the first photoresist layer is smaller than a lower end width w2 of the second photoresist layer, and a tapering angle $\theta1$ of the first photoresist layer is equal to a tapering angle $\theta2$ of the second photoresist layer, and under such a condition, the tapering angle $\theta$ of the photo spacer is greater than the tapering angle $\theta1$ of the first photoresist layer and the tapering angle $\theta2$ of the second photoresist layer;

a second structure being such that the upper end width w1 of the first photoresist layer is smaller than the lower end width w2 of the second photoresist layer, and the tapering angle $\theta1$ of the first photoresist layer is smaller than the tapering angle $\theta2$ of the second photoresist layer, and under such a condition, the tapering angle $\theta$ of the photo spacer is greater than the tapering angle θ1 of the first photoresist layer and the tapering angle θ2 of the second photoresist layer; and a third structure being such that the upper end width w1 of the first photoresist layer is greater than the lower end width w2 of the second photoresist layer; a thickness T1 of the first photoresist layer is smaller than a thickness T2 of the second photoresist layer; and the tapering angle θ1 of the first photoresist layer is smaller than the tapering angle θ2 of the second photoresist layer, and under such a condition, the tapering angle θ of the photo spacer is greater than the tapering angle θ1 of the first photoresist layer but smaller than the tapering angle θ2 of the second photoresist layer; and dropping a liquid crystal material onto the first base plate or the second base plate and aligning and combining the first base plate and the second base plate together such that the liquid crystal material located between the first base plate and the second base plate forms a liquid crystal layer and upper ends of the plurality of photo spacers are in contact engagement with the second base plate to thereby form a liquid crystal display panel.

The tapering angle θ of the photo spacer is between 20°-80°.

The manufacturing method of the liquid crystal display panel according to the present invention further comprises: forming one or multiple third photoresist films on the second photoresist film, wherein the one or multiple third photoresist films, after being subjected to exposure and development, form one or multiple third photoresist layers, and the photo spacers are formed of the first photoresist layer, the second photoresist layer, and the one or multiple third photoresist layers, wherein the first photoresist layer, the second photoresist layer, and the one or multiple third photoresist layers have different properties of photosensitivity and different patterns.

The first photoresist film and the second photoresist film having different absorption wavelengths for photo reaction is that the first photoresist film and the second photoresist film comprise photo initiators that have different absorption wavelengths; and the first base plate and the second base plate respectively comprises a color filter substrate and a thin-film transistor array substrate or respectively comprise a thin-film transistor array substrate and a color filter substrate.

The structure of the plurality of photo spacers provided on the first base plate comprises one or multiple ones of the first structure, the second structure, and the third structure.

The present invention also provides a liquid crystal display panel, which comprises: a first base plate and a second base plate that are arranged opposite to each other, a liquid crystal layer that is arranged between the first base plate and the second base plate, and a plurality of photo spacers that are arranged on one side of the first base plate that faces the liquid crystal layer and are spaced from each other, wherein upper ends of the plurality of photo spacers are in contact engagement with the second base plate;

wherein the photo spacers each comprise a first photoresist layer arranged on the first base plate and a second photoresist layer arranged on the first photoresist layer, wherein the first photoresist layer and the second photoresist layer demonstrate different properties of photosensitivity, such that the first photoresist layer and the second photoresist layer have different absorption wavelengths for photo reaction, or alternatively, the first photoresist layer and the second photoresist layer demonstrate different sensitivities for photo reaction with light of the same wavelength, the first photoresist layer and the second photoresist layer being of different patterns, wherein being of different patterns is that a difference exists in at least one of parameters including upper end size, lower end size, and tapering angle, and wherein a tapering angle θ of the photo spacers is defined as an angle between a line connecting an edge of a lower end of the first photoresist layer and an edge of an upper end of the second photoresist layer and the first base plate, and wherein the photo spacers have a structure that is one of the following three structures:

a first structure being such that an upper end width w1 of the first photoresist layer is smaller than a lower end width w2 of the second photoresist layer, and a tapering angle θ1 of the first photoresist layer is equal to a tapering angle θ2 of the second photoresist layer, and under such a condition, the tapering angle θ of the photo spacer is greater than the tapering angle θ1 of the first photoresist layer and the tapering angle θ2 of the second photoresist layer;

a second structure being such that the upper end width w1 of the first photoresist layer is smaller than the lower end width w2 of the second photoresist layer, and the tapering angle θ1 of the first photoresist layer is smaller than the tapering angle θ2 of the second photoresist layer, and under such a condition, the tapering angle θ of the photo spacer is greater than the tapering angle θ1 of the first photoresist layer and the tapering angle θ2 of the second photoresist layer; and a third structure being such that the upper end width w1 of the first photoresist layer is greater than the lower end width w2 of the second photoresist layer; a thickness T1 of the first photoresist layer is smaller than a thickness T2 of the second photoresist layer; and the tapering angle θ1 of the first photoresist layer is smaller than the tapering angle θ2 of the second photoresist layer, and under such a condition, the tapering angle θ of the photo spacer is greater than the tapering angle θ1 of the first photoresist layer but smaller than the tapering angle θ2 of the second photoresist layer.

The tapering angle θ of the photo spacer is between 20°-80°.

The photo spacers further comprise: one or multiple third photoresist layers arranged on the second photoresist layer, wherein the first photoresist layer, the second photoresist layer, and the one or multiple third photoresist layers have different properties of photosensitivity and different patterns.

The first photoresist layer and the second photoresist layer having different absorption wavelengths for photo reaction is that the first photoresist layer and the second photoresist layer comprise photo initiators that have different absorption wavelengths; and the first base plate and the second base plate respectively comprises a color filter substrate and a thin-film transistor array substrate or respectively comprise a thin-film transistor array substrate and a color filter substrate.

The structure of the plurality of photo spacers provided on the first base plate comprises one or multiple ones of the first structure, the second structure, and the third structure.

The present invention further provides a manufacturing method of a liquid crystal display panel, which comprises:

providing a first base plate and a second base plate, forming a first photoresist film on the first base plate, and forming a second photoresist film on the first photoresist film, wherein the first photoresist film and the second photoresist film demonstrate different properties of photosensitivity, wherein the first photoresist film and the second photoresist film have different absorption wavelengths for photo reaction, or alternatively, the first photoresist film and the second photoresist film demonstrate different sensitivities for photo reaction with light of the same wavelength;

using one mask plate to subject the first photoresist film and the second photoresist film to one round of exposure and development process to form a first photoresist layer and a second photoresist layer that are of different patterns so as to form a plurality of photo spacers, which are spaced from each other, on the first base plate, wherein being of different patterns is that a difference exists in at least one of parameters including upper end size, lower end size, and tapering angle and wherein the photo spacers each comprise the first photoresist layer that is arranged on the first base plate and the second photoresist layer that is arranged on the first photoresist layer and a tapering angle $\theta$ of the photo spacers is defined as an angle between a line connecting an edge of a lower end of the first photoresist layer and an edge of an upper end of the second photoresist layer and the first base plate, and wherein the photo spacers have a structure that is one of the following three structures:

a first structure being such that an upper end width $w1$ of the first photoresist layer is smaller than a lower end width $w2$ of the second photoresist layer, and a tapering angle $\theta1$ of the first photoresist layer is equal to a tapering angle $\theta2$ of the second photoresist layer, and under such a condition, the tapering angle $\theta$ of the photo spacer is greater than the tapering angle $\theta1$ of the first photoresist layer and the tapering angle $\theta2$ of the second photoresist layer;

a second structure being such that the upper end width $w1$ of the first photoresist layer is smaller than the lower end width $w2$ of the second photoresist layer, and the tapering angle $\theta1$ of the first photoresist layer is smaller than the tapering angle $\theta2$ of the second photoresist layer, and under such a condition, the tapering angle $\theta$ of the photo spacer is greater than the tapering angle $\theta1$ of the first photoresist layer and the tapering angle $\theta2$ of the second photoresist layer; and a third structure being such that the upper end width $w1$ of the first photoresist layer is greater than the lower end width $w2$ of the second photoresist layer; a thickness $T1$ of the first photoresist layer is smaller than a thickness $T2$ of the second photoresist layer; and the tapering angle $\theta1$ of the first photoresist layer is smaller than the tapering angle $\theta2$ of the second photoresist layer, and under such a condition, the tapering angle $\theta$ of the photo spacer is greater than the tapering angle $\theta1$ of the first photoresist layer but smaller than the tapering angle $\theta2$ of the second photoresist layer; and dropping a liquid crystal material onto the first base plate or the second base plate and aligning and combining the first base plate and the second base plate together such that the liquid crystal material located between the first base plate and the second base plate forms a liquid crystal layer and upper ends of the plurality of photo spacers are in contact engagement with the second base plate to thereby form a liquid crystal display panel;

wherein the tapering angle $\theta$ of the photo spacer is between 20°-80°;

further comprising: forming one or multiple third photoresist films on the second photoresist film, wherein the one or multiple third photoresist films, after being subjected to exposure and development, form one or multiple third photoresist layers, and the photo spacers are formed of the first photoresist layer, the second photoresist layer, and the one or multiple third photoresist layers, wherein the first photoresist layer, the second photoresist layer, and the one or multiple third photoresist layers have different properties of photosensitivity and different patterns;

wherein the first photoresist film and the second photoresist film having different absorption wavelengths for photo reaction is that the first photoresist film and the second photoresist film comprise photo initiators that have different absorption wavelengths; and the first base plate and the second base plate respectively comprises a color filter substrate and a thin-film transistor array substrate or respectively comprise a thin-film transistor array substrate and a color filter substrate; and wherein the structure of the plurality of photo spacers provided on the first base plate comprises one or multiple ones of the first structure, the second structure, and the third structure.

The efficacy of the present invention is that the present invention provides a liquid crystal display panel and a manufacturing method thereof. The manufacturing method of the liquid crystal display panel according to the present invention uses a regular mask plate to subject multiple layers of photoresist films that are stacked on each other to patterning treatment with just one round of exposure and development process to form multiple photoresist layers that are stacked on each other, wherein the multiple stacked photoresist layers form photo spacers. Due to the multiple layers of photoresist films having different photosensitivity properties, the multiple photoresist layers, which are formed after being subjected to exposure and development, are of different patterns, wherein being of different patterns means there is a difference existing in at least one of parameters including upper end size, lower end size, and tapering angle. The present invention makes use of the multiple photoresist layers of different patterns to achieve adjustment of the tapering angle $\theta$ of the photo spacer in order to effectively enlarge the tapering angle $\theta$ of the photo spacers to thereby save the space for arrangement of the photo spacers, reduce an effect of blocking the liquid crystal material caused by the photo spacer, and also to improve the effect of supporting achieved with the photo spacers. Further, the present invention uses a regular mask plate to make photo spacers with just one round of exposure and development process so that the manufacturing process is simple, the operation being a mature and controllable one and the cost being low. The liquid crystal display panel according to the present invention comprises photo spacers that each comprise multiple photoresist layers stacked on each other, wherein the multiple photoresist layers are of different patterns so as to provide the photo spacers with a relatively large tapering angle $\theta$ to thereby effectively enlarge the tapering angle $\theta$ of the photo spacers and thus saving the space for arrangement of the photo spacers, reducing an effect of blocking the liquid crystal material caused by the photo spacers and providing enhanced supporting performance.

For better understanding of the features and technical contents of the present invention, reference will be made to the following detailed description of the present invention and the attached drawings. However, the drawings are provided only for reference and illustration and are not intended to limit the present invention.

BRIEF DESCRIPTION OF THE DRAWINGS

The technical solution, as well as other beneficial advantages, of the present invention will become apparent from the following detailed description of embodiments of the present invention, with reference to the attached drawings.

In the drawings.

DETAILED DESCRIPTION OF THE PREFERRED EMBODIMENTS

To further expound the technical solution adopted in the present invention and the advantages thereof, a detailed description will be given with reference to the preferred embodiments of the present invention and the drawings thereof.

Figure 1:
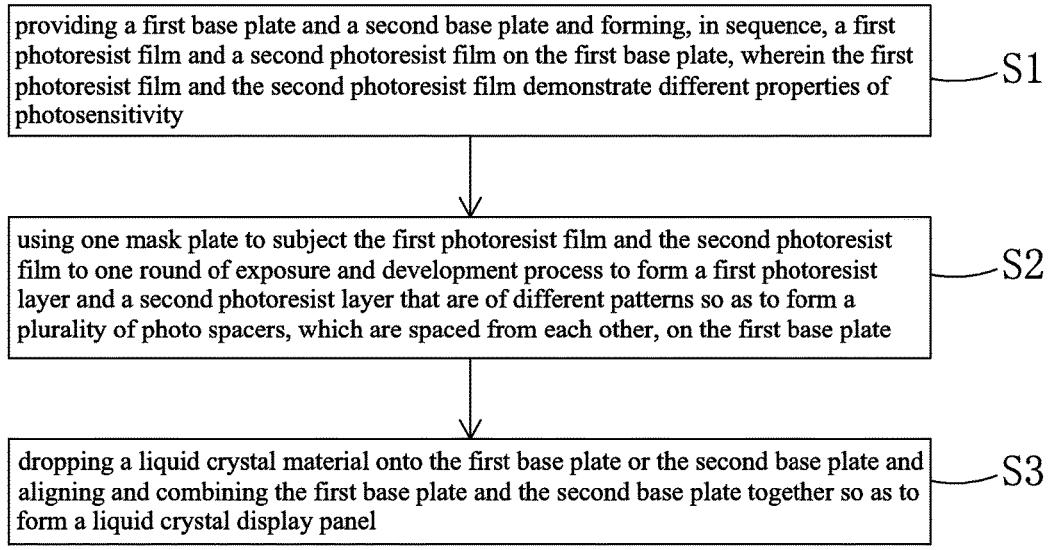
FIG. 1 is a flow chart illustrating a manufacturing method of a liquid crystal display panel according to the present invention.
Figure 2:
FIGS. 2 and 3 are schematic views illustrating Step 1 of the manufacturing method of the liquid crystal display panel according to the present invention.
Figure 2:
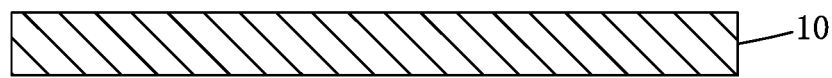
Figure 3:
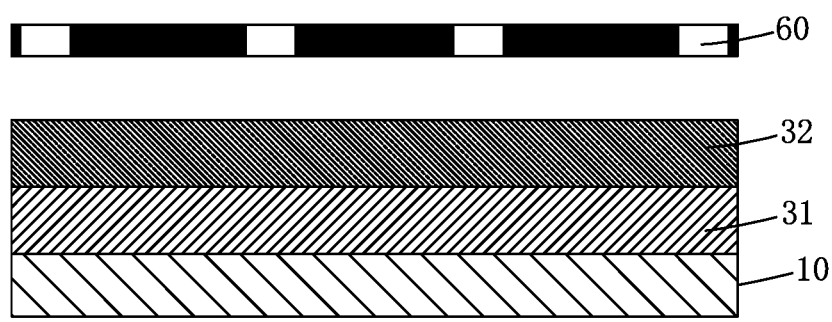
Figure 4:
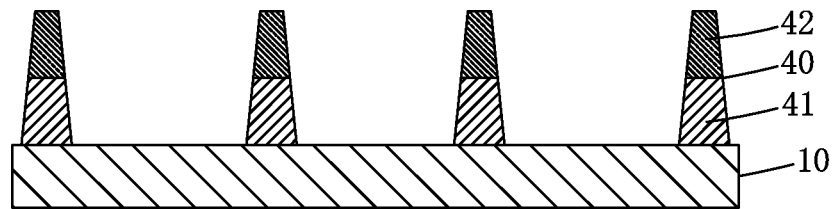
FIG. 4 is a schematic view illustrating Step 2 of the manufacturing method of the liquid crystal display panel according to the present invention.

Referring to FIG. 1, the present invention provides a manufacturing method of a liquid crystal display panel, which comprises the following steps:

Step 1: as shown in FIGS. 2 and 3, providing a first base plate 10 and a second base plate 20, forming a first photoresist film 31 on the first base plate 10, and forming a second photoresist film 32 on the first photoresist film 31, wherein the first photoresist film 31 and the second photoresist film 32 demonstrate different properties of photosensitivity, wherein the first photoresist film 31 and the second photoresist film 32 have different absorption wavelengths for photo reaction, or alternatively, the first photoresist film 31 and the second photoresist film 32 demonstrate different sensitivities for photo reaction with light of the same wavelength.

Specifically, the first photoresist film 31 and the second photoresist film 32 are made of materials that are both photosensitive resin.

Specifically, that the first photoresist film 31 and the second photoresist film 32 have different absorption wavelengths for photo reaction means the first photoresist film 31 and the second photoresist film 32 comprise photo initiators that have different absorption wavelengths.

Figure 5:
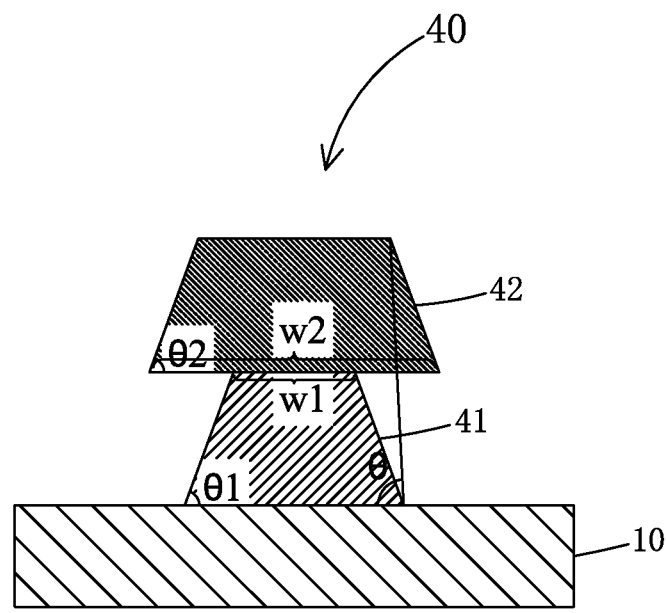
FIG. 5 is a schematic view illustrating a first structure of a photo spacer formed in Step 2 of the manufacturing method of the liquid crystal display panel according to the present invention.
Figure 6:
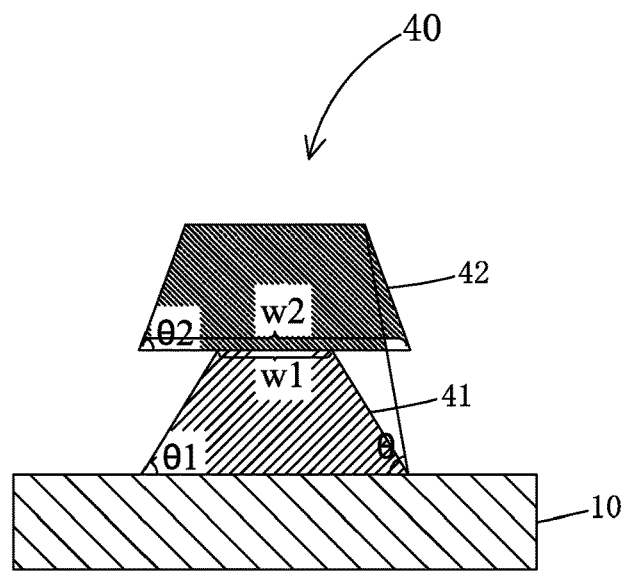
FIG. 6 is a schematic view illustrating a second structure of the photo spacer formed in Step 2 of the manufacturing method of the liquid crystal display panel according to the present invention.
Figure 7:
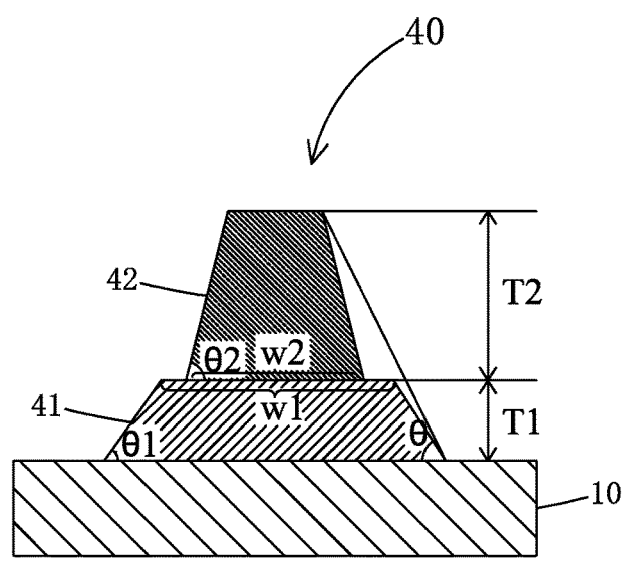
FIG. 7 is a schematic view illustrating a third structure of the photo spacer formed in Step 2 of the manufacturing method of the liquid crystal display panel according to the present invention.

Step 2: as shown in FIGS. 4-7, using one mask plate 60 to subject the first photoresist film 31 and the second photoresist film 32 to one round of exposure and development process to form a first photoresist layer 41 and a second photoresist layer 42 that are of different patterns so as to form a plurality of photo spacers 40, which are spaced from each other, on the first base plate 10, wherein being of different patterns is that a difference exists in at least one of parameters including upper end size, lower end size, and tapering angle and wherein the photo spacers 40 each comprise the first photoresist layer 41 that is arranged on the first base plate 10 and the second photoresist layer 42 that is arranged on the first photoresist layer 41 and a tapering angle θ of the photo spacers 40 is defined as an angle between a line connecting an edge of a lower end of the first photoresist layer 41 and an edge of an upper end of the second photoresist layer 42 and the first base plate 10, and wherein the photo spacers 40 have a structure that is one of the following three structures:

as shown in FIG. 5, the first structure being such that an upper end width w1 of the first photoresist layer 41 is smaller than a lower end width w2 of the second photoresist layer 42, and a tapering angle θ1 of the first photoresist layer 41 is equal to a tapering angle θ2 of the second photoresist layer 42, and under such a condition, the tapering angle θ of the photo spacer 40 is greater than the tapering angle θ1 of the first photoresist layer 41 and the tapering angle θ2 of the second photoresist layer 42 so as to enlarge the tapering angle θ of the photo spacer 40;

as shown in FIG. 6, the second structure being such that the upper end width w1 of the first photoresist layer 41 is smaller than the lower end width w2 of the second photoresist layer 42, and the tapering angle θ1 of the first photoresist layer 41 is smaller than the tapering angle θ2 of the second photoresist layer 42, and under such a condition, the tapering angle θ of the photo spacer 40 is greater than the tapering angle θ1 of the first photoresist layer 41 and the tapering angle θ2 of the second photoresist layer 42 so as to enlarge the tapering angle θ of the photo spacer 40; and as shown in FIG. 7, the third structure being such that the upper end width w1 of the first photoresist layer 41 is greater than the lower end width w2 of the second photoresist layer 42; a thickness T1 of the first photoresist layer 41 is smaller than a thickness T2 of the second photoresist layer 42; and the tapering angle θ1 of the first photoresist layer 41 is smaller than the tapering angle θ2 of the second photoresist layer 42, and under such a condition, the tapering angle θ of the photo spacer 40 is greater than the tapering angle θ1 of the first photoresist layer 41 but smaller than the tapering angle θ2 of the second photoresist layer 42 so that with the thickness T1 of the first photoresist layer 41 being far smaller than the thickness T2 of the second photoresist layer 42, the tapering angle θ of the photo spacer 40 gets infinitely close to the tapering angle θ2 of the second photoresist layer 42. For a condition that the first photoresist layer 41 is omitted and a height of the second photoresist layer 42 is changed to T1+T2 so that the photo spacer 40 is constituted only with the second photoresist layer 42, then, deformation caused by flat flowing and collapsing occurring in operations of for example high temperature baking and development would make it impossible to ensure that the tapering angle θ2 of the second photoresist layer 42 is a larger tapering angle, and thus, it may not be possible to effectively enlarge the tapering angle θ of the photo spacer 40. The third structure, when made in the form of a dual-layered structure, would be capable of effectively enlarging the tapering angle θ of the photo spacer 40.

Figure 8:
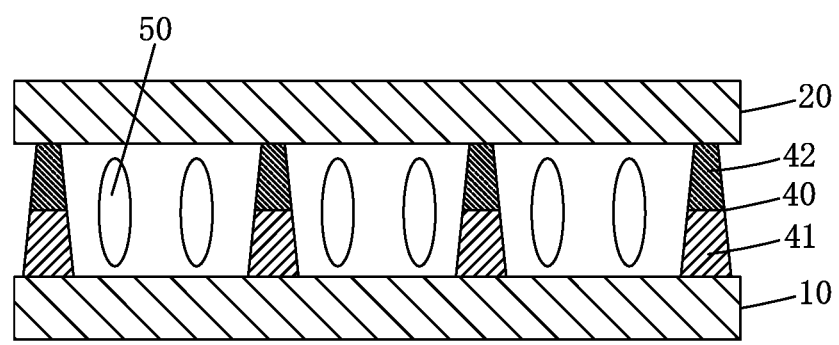
FIG. 8 is a schematic view illustrating Step 3 of the manufacturing method of the liquid crystal display panel according to the present invention and is also a schematic view illustrating a structure of the liquid crystal display panel according to the present invention.

Step 3: as shown in FIG. 8, dropping a liquid crystal material onto the first base plate 10 or the second base plate 20 and aligning and combining the first base plate 10 and the second base plate 20 together such that the liquid crystal material located between the first base plate 10 and the second base plate 20 forms a liquid crystal layer 50 and upper ends of the plurality of photo spacers 40 are in contact engagement with the second base plate 20 to thereby form a liquid crystal display panel.

Specifically, the tapering angle θ of the photo spacer 40 is between 20°-80°. Most preferably, the tapering angle θ of the photo spacer 40 is 60°.

Specifically, the manufacturing method of the liquid crystal display panel according to the present invention may further comprise: forming one or multiple third photoresist films (not shown) on the second photoresist film 32, wherein the one or multiple third photoresist films, after being subjected to exposure and development, form one or multiple third photoresist layers (not shown), and the photo spacers are formed of the first photoresist layer 41, the second photoresist layer 42, and the one or multiple third photoresist layers, wherein the first photoresist layer 41, the second photoresist layer 42, and the one or multiple third photoresist layers have different properties of photosensitivity and different patterns and the more the third photoresist layers is, the greater the range of adjustability of the tapering angle θ of the photo spacer 40 will be, but the more complicated the manufacturing process would be.

Specifically, the first base plate 10 and the second base plate 20 respectively comprise a color filter substrate and a thin-film transistor array substrate or respectively comprise a thin-film transistor array substrate and a color filter substrate. Namely, the substrate on which the photo spacers 40 are arranged can be a thin-film transistor array substrate or a color filter substrate.

Specifically, the structure of the plurality of photo spacers 40 provided on the first base plate 10 may comprises one or multiple ones of the first structure, the second structure, and the third structure.

Since the photo spacers 40 made in this invention have a relatively large tapering angle θ, the photo spacers 40 may achieve bettered supporting performance so that liquid crystal cell thickness may not be changed even when the liquid crystal display panel is subjected to pressing with an external force and thus quality of image forming can be guaranteed.

The manufacturing method of the liquid crystal display panel according to the present invention uses a regular mask plate to subject multiple layers of photoresist films that are stacked on each other to patterning treatment with just one round of exposure and development process to form multiple photoresist layers that are stacked on each other, wherein the multiple stacked photoresist layers form photo spacers 40. Due to the multiple layers of photoresist films having different photosensitivity properties, the multiple photoresist layers, which are formed after being subjected to exposure and development, are of different patterns, wherein being of different patterns means there is a difference existing in at least one of parameters including upper end size, lower end size, and tapering angle. The present invention makes use of the multiple photoresist layers of different patterns to achieve adjustment of the tapering angle θ of the photo spacer 40 in order to effectively enlarge the tapering angle θ of the photo spacer 40 to thereby save the space for arrangement of the photo spacers 40, reduce an effect of blocking the liquid crystal material caused by the photo spacer 40, and also to improve the effect of supporting achieved with the photo spacers 40. Further, the present invention uses a regular mask plate to make photo spacers with just one round of exposure and development process so that the manufacturing process is simple, the operation being a mature and controllable one and the cost being low.

Referring to FIG. 8, in combination with FIGS. 5-7, based on the above-described manufacturing method of a liquid crystal display panel, the present invention also provides a liquid crystal display panel, which comprises: a first base plate 10 and a second base plate 20 that are arranged opposite to each other, a liquid crystal layer 50 that is arranged between the first base plate 10 and the second base plate 20, and a plurality of photo spacers 40 that are arranged on one side of the first base plate 10 that faces the liquid crystal layer 50 and are spaced from each other, wherein upper ends of the plurality of photo spacers 40 are in contact engagement with the second base plate 20.

The photo spacers 40 each comprises a first photoresist layer 41 arranged on the first base plate 10 and a second photoresist layer 42 arranged on the first photoresist layer 41, wherein the first photoresist layer 41 and the second photoresist layer 42 demonstrate different properties of photosensitivity, meaning the first photoresist layer 41 and the second photoresist layer 42 have different absorption wavelengths for photo reaction, or alternatively, the first photoresist layer 41 and the second photoresist layer 42 demonstrate different sensitivities for photo reaction with light of the same wavelength. The first photoresist layer 41 and the second photoresist layer 42 are of different patterns, wherein being of different patterns is that a difference exists in at least one of parameters including upper end size, lower end size, and tapering angle, and wherein a tapering angle θ of the photo spacers 40 is defined as an angle between a line connecting an edge of a lower end of the first photoresist layer 41 and an edge of an upper end of the second photoresist layer 42 and the first base plate 10, and wherein the photo spacers 40 have a structure that is one of the following three structures:

as shown in FIG. 5, the first structure being such that an upper end width w1 of the first photoresist layer 41 is smaller than a lower end width w2 of the second photoresist layer 42, and a tapering angle θ1 of the first photoresist layer 41 is equal to a tapering angle θ2 of the second photoresist layer 42, and under such a condition, the tapering angle θ of the photo spacer 40 is greater than the tapering angle θ1 of the first photoresist layer 41 and the tapering angle θ2 of the second photoresist layer 42;

as shown in FIG. 6, the second structure being such that the upper end width w1 of the first photoresist layer 41 is smaller than the lower end width w2 of the second photoresist layer 42, and the tapering angle θ1 of the first photoresist layer 41 is smaller than the tapering angle θ2 of the second photoresist layer 42, and under such a condition, the tapering angle θ of the photo spacer 40 is greater than the tapering angle θ1 of the first photoresist layer 41 and the tapering angle θ2 of the second photoresist layer 42; and as shown in FIG. 7, the third structure being such that the upper end width w1 of the first photoresist layer 41 is greater than the lower end width w2 of the second photoresist layer 42; a thickness T1 of the first photoresist layer 41 is smaller than a thickness T2 of the second photoresist layer 42; and the tapering angle θ1 of the first photoresist layer 41 is smaller than the tapering angle θ2 of the second photoresist layer 42, and under such a condition, the tapering angle θ of the photo spacer 40 is greater than the tapering angle θ1 of the first photoresist layer 41 but smaller than the tapering angle θ2 of the second photoresist layer 42.

Specifically, that the first photoresist layer 41 and the second photoresist layer 42 have different absorption wavelengths for photo reaction means the first photoresist layer 41 and the second photoresist layer 42 comprise photo initiators that have different absorption wavelengths.

Specifically, the tapering angle θ of the photo spacer 40 is between 20°-80°. Most preferably, the tapering angle θ of the photo spacer 40 is 60°.

Specifically, the photo spacers 40 may further comprise: one or multiple third photoresist layers (not shown) arranged on the second photoresist layer 42, wherein the first photoresist layer 41, the second photoresist layer 42, and the one or multiple third photoresist layers have different properties of photosensitivity and different patterns and the more the third photoresist layers is, the greater the range of adjustability of the tapering angle θ of the photo spacer 40 will be, but the more complicated the manufacturing process would be.

Specifically, the first base plate 10 and the second base plate 20 respectively comprise a color filter substrate and a thin-film transistor array substrate or respectively comprise a thin-film transistor array substrate and a color filter substrate. Namely, the substrate on which the photo spacers 40 are arranged can be a thin-film transistor array substrate or a color filter substrate.

Specifically, the structure of the plurality of photo spacers 40 provided on the first base plate 10 may comprises one or multiple ones of the first structure, the second structure, and the third structure.

The liquid crystal display panel according to the present invention comprises photo spacers 40 that each comprise multiple photoresist layers stacked on each other, wherein the multiple photoresist layers are of different patterns. The present invention makes use of the multiple photoresist layers of different patterns to achieve adjustment of the tapering angle θ of the photo spacers 40 in order to effectively enlarge the tapering angle θ of the photo spacers 40 to thereby save the space for arrangement of the photo spacers 40 and reduce an effect of blocking the liquid crystal material caused by the photo spacers 40 and provide enhanced supporting performance.

In summary, the present invention provides a liquid crystal display panel and a manufacturing method thereof. The manufacturing method of the liquid crystal display panel according to the present invention uses a regular mask plate to subject multiple layers of photoresist films that are stacked on each other to patterning treatment with just one round of exposure and development process to form multiple photoresist layers that are stacked on each other, wherein the multiple stacked photoresist layers form photo spacers. Due to the multiple layers of photoresist films having different photosensitivity properties, the multiple photoresist layers, which are formed after being subjected to exposure and development, are of different patterns, wherein being of different patterns means there is a difference existing in at least one of parameters including upper end size, lower end size, and tapering angle. The present invention makes use of the multiple photoresist layers of different patterns to achieve adjustment of the tapering angle θ of the photo spacer in order to effectively enlarge the tapering angle θ of the photo spacers to thereby save the space for arrangement of the photo spacers, reduce an effect of blocking the liquid crystal material caused by the photo spacer, and also to improve the effect of supporting achieved with the photo spacers. Further, the present invention uses a regular mask plate to make photo spacers with just one round of exposure and development process so that the manufacturing process is simple, the operation being a mature and controllable one and the cost being low. The liquid crystal display panel according to the present invention comprises photo spacers that each comprise multiple photoresist layers stacked on each other, wherein the multiple photoresist layers are of different patterns so as to provide the photo spacers with a relatively large tapering angle θ to thereby effectively enlarge the tapering angle θ of the photo spacers and thus saving the space for arrangement of the photo spacers, reducing an effect of blocking the liquid crystal material caused by the photo spacers and providing enhanced supporting performance.

Based on the description given above, those having ordinary skills in the art may easily contemplate various changes and modifications of the technical solution and the technical ideas of the present invention. All these changes and modifications are considered belonging to the protection scope of the present invention as defined in the appended claims.

What is claimed is:

1. A manufacturing method of a liquid crystal display panel, comprising:

providing a first base plate and a second base plate, forming a first photoresist film on the first base plate, and forming a second photoresist film on the first photoresist film, wherein the first photoresist film and the second photoresist film demonstrate different properties of photosensitivity, wherein the first photoresist film and the second photoresist film have different absorption wavelengths for photo reaction, or alternatively, the first photoresist film and the second photoresist film demonstrate different sensitivities for photo reaction with light of the same wavelength;

using one mask plate to subject the first photoresist film and the second photoresist film to one round of exposure and development process to form a first photoresist layer and a second photoresist layer that are of different patterns so as to form a plurality of photo spacers, which are spaced from each other, on the first base plate, wherein being of different patterns is that a difference exists in at least one of parameters including upper end size, lower end size, and tapering angle and wherein the photo spacers each comprise the first photoresist layer that is arranged on the first base plate and the second photoresist layer that is arranged on the first photoresist layer and a tapering angle θ of the photo spacers is defined as an angle between a line connecting an edge of a lower end of the first photoresist layer and an edge of an upper end of the second photoresist layer and the first base plate, and wherein the photo spacers have a following structure:

the structure being such that an upper end width w1 of the first photoresist layer is smaller than a lower end width w2 of the second photoresist layer, and a tapering angle θ1 of the first photoresist layer is equal to a tapering angle θ2 of the second photoresist layer, and under such a condition, the tapering angle θ of the photo spacer is greater than the tapering angle θ1 of the first photoresist layer and the tapering angle θ2 of the second photoresist layer; and dropping a liquid crystal material onto the first base plate or the second base plate and aligning and combining the first base plate and the second base plate together such that the liquid crystal material located between the first base plate and the second base plate forms a liquid crystal layer and upper ends of the plurality of photo spacers are in contact engagement with the second base plate to thereby form a liquid crystal display panel.

2. The manufacturing method of the liquid crystal display panel as claimed in claim 1, wherein the tapering angle θ of the photo spacer is between 20°-80°.

3. The manufacturing method of the liquid crystal display panel as claimed in claim 1 further comprising: forming one or multiple third photoresist films on the second photoresist film, wherein the one or multiple third photoresist films, after being subjected to exposure and development, form one or multiple third photoresist layers, and the photo spacers are formed of the first photoresist layer, the second photoresist layer, and the one or multiple third photoresist layers, wherein the first photoresist layer, the second photoresist layer, and the one or multiple third photoresist layers have different properties of photosensitivity and different patterns.

4. The manufacturing method of the liquid crystal display panel as claimed in claim 1, wherein the first photoresist film and the second photoresist film having different absorption wavelengths for photo reaction is that the first photoresist film and the second photoresist film comprise photo initiators that have different absorption wavelengths; and the first base plate and the second base plate respectively comprises a color filter substrate and a thin-film transistor array substrate or respectively comprise a thin-film transistor array substrate and a color filter substrate.

5. The manufacturing method of the liquid crystal display panel as claimed in claim 1, wherein the structure of the plurality of photo spacers provided on the first base plate comprises one or multiple ones of the first structure, the second structure, and the third structure.

6. A liquid crystal display panel, comprising: a first base plate and a second base plate that are arranged opposite to each other, a liquid crystal layer that is arranged between the first base plate and the second base plate, and a plurality of photo spacers that are arranged on one side of the first base plate that faces the liquid crystal layer and are spaced from each other, wherein upper ends of the plurality of photo spacers are in contact engagement with the second base plate;

wherein the photo spacers each comprise a first photoresist layer arranged on the first base plate and a second photoresist layer arranged on the first photoresist layer, wherein the first photoresist layer and the second photoresist layer demonstrate different properties of photosensitivity, such that the first photoresist layer and the second photoresist layer have different absorption wavelengths for photo reaction, or alternatively, the first photoresist layer and the second photoresist layer demonstrate different sensitivities for photo reaction with light of the same wavelength, the first photoresist layer and the second photoresist layer being of different patterns, wherein being of different patterns is that a difference exists in at least one of parameters including upper end size, lower end size, and tapering angle, and wherein a tapering angle θ of the photo spacers is defined as an angle between a line connecting an edge of a lower end of the first photoresist layer and an edge of an upper end of the second photoresist layer and the first base plate, and wherein the photo spacers have a following structure:

the structure being such that an upper end width w1 of the first photoresist layer is smaller than a lower end width w2 of the second photoresist layer, and a tapering angle θ1 of the first photoresist layer is equal to a tapering angle θ2 of the second photoresist layer, and under such a condition, the tapering angle θ of the photo spacer is greater than the tapering angle θ1 of the first photoresist layer and the tapering angle θ2 of the second photoresist layer.

7. The liquid crystal display panel as claimed in claim 6, wherein the tapering angle θ of the photo spacer is between 20°-80°.

8. The liquid crystal display panel as claimed in claim 6, wherein the photo spacers further comprise: one or multiple third photoresist layers arranged on the second photoresist layer, wherein the first photoresist layer, the second photoresist layer, and the one or multiple third photoresist layers have different properties of photosensitivity and different patterns.

9. The liquid crystal display panel as claimed in claim 6, wherein the first photoresist layer and the second photoresist layer having different absorption wavelengths for photo reaction is that the first photoresist layer and the second photoresist layer comprise photo initiators that have different absorption wavelengths; and the first base plate and the second base plate respectively comprises a color filter substrate and a thin-film transistor array substrate or respectively comprise a thin-film transistor array substrate and a color filter substrate.

10. The liquid crystal display panel as claimed in claim 6, wherein the structure of the plurality of photo spacers provided on the first base plate comprises one or multiple ones of the first structure, the second structure, and the third structure.

11. A manufacturing method of a liquid crystal display panel, comprising:

providing a first base plate and a second base plate, forming a first photoresist film on the first base plate, and forming a second photoresist film on the first photoresist film, wherein the first photoresist film and the second photoresist film demonstrate different properties of photosensitivity, wherein the first photoresist film and the second photoresist film have different absorption wavelengths for photo reaction, or alternatively, the first photoresist film and the second photoresist film demonstrate different sensitivities for photo reaction with light of the same wavelength;

using one mask plate to subject the first photoresist film and the second photoresist film to one round of exposure and development process to form a first photoresist layer and a second photoresist layer that are of different patterns so as to form a plurality of photo spacers, which are spaced from each other, on the first base plate, wherein being of different patterns is that a difference exists in at least one of parameters including upper end size, lower end size, and tapering angle and wherein the photo spacers each comprise the first photoresist layer that is arranged on the first base plate and the second photoresist layer that is arranged on the first photoresist layer and a tapering angle θ of the photo spacers is defined as an angle between a line connecting an edge of a lower end of the first photoresist layer and an edge of an upper end of the second photoresist layer and the first base plate, and wherein the photo spacers have a following structure:

the structure being such that an upper end width w1 of the first photoresist layer is smaller than a lower end width w2 of the second photoresist layer, and a tapering angle θ1 of the first photoresist layer is equal to a tapering angle θ2 of the second photoresist layer, and under such a condition, the tapering angle θ of the photo spacer is greater than the tapering angle θ1 of the first photoresist layer and the tapering angle θ2 of the second photoresist layer; and dropping a liquid crystal material onto the first base plate or the second base plate and aligning and combining the first base plate and the second base plate together such that the liquid crystal material located between the first base plate and the second base plate forms a liquid crystal layer and upper ends of the plurality of photo spacers are in contact engagement with the second base plate to thereby form a liquid crystal display panel;

wherein the tapering angle θ of the photo spacer is between 20°-80°;

further comprising: forming one or multiple third photoresist films on the second photoresist film, wherein the one or multiple third photoresist films, after being subjected to exposure and development, form one or multiple third photoresist layers, and the photo spacers are formed of the first photoresist layer, the second photoresist layer, and the one or multiple third photoresist layers, wherein the first photoresist layer, the second photoresist layer, and the one or multiple third photoresist layers have different properties of photosensitivity and different patterns;

wherein the first photoresist film and the second photoresist film having different absorption wavelengths for photo reaction is that the first photoresist film and the second photoresist film comprise photo initiators that have different absorption wavelengths; and the first base plate and the second base plate respectively comprises a color filter substrate and a thin-film transistor array substrate or respectively comprise a thin-film transistor array substrate and a color filter substrate; and wherein the structure of the plurality of photo spacers provided on the first base plate comprises one or multiple ones of the first structure, the second structure, and the third structure.

* * * * *